Sept. 13, 1932.     J. A. SELBY     1,877,065
AUTOMOBILE WINDSHIELD SCREEN
Filed Dec. 14, 1931
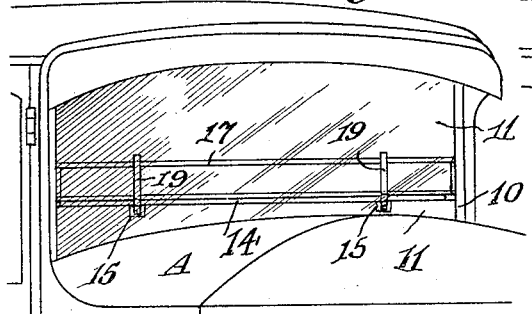
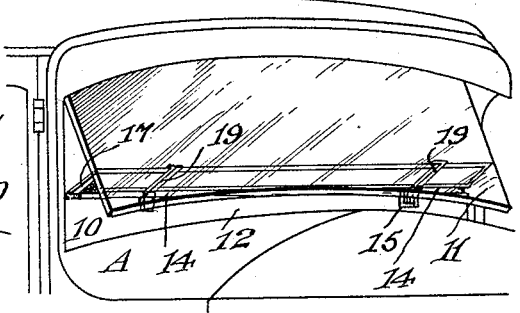
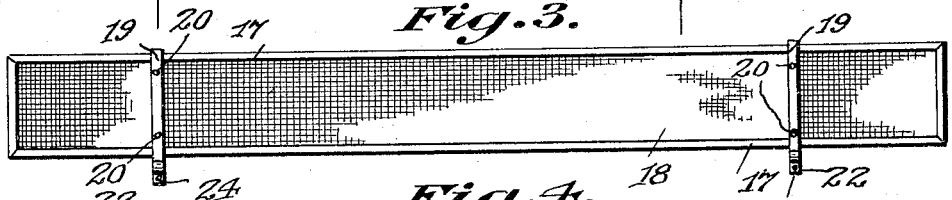
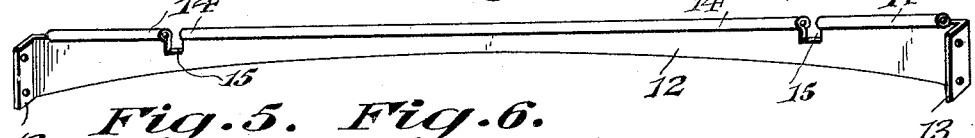
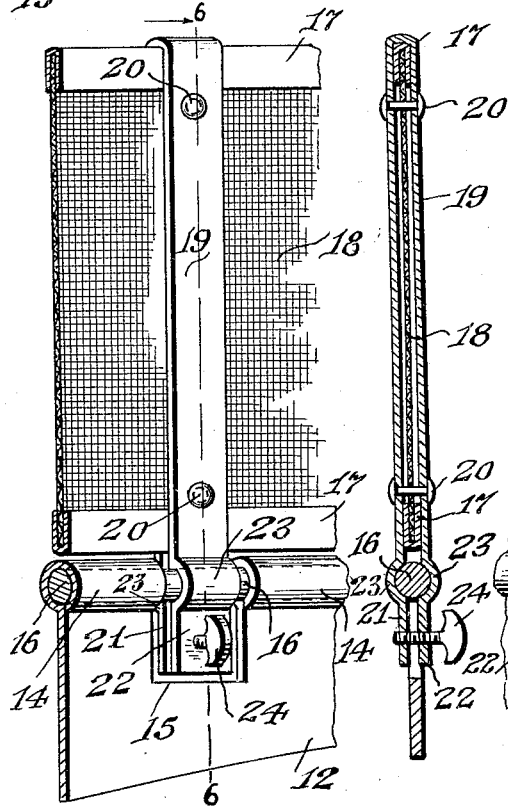
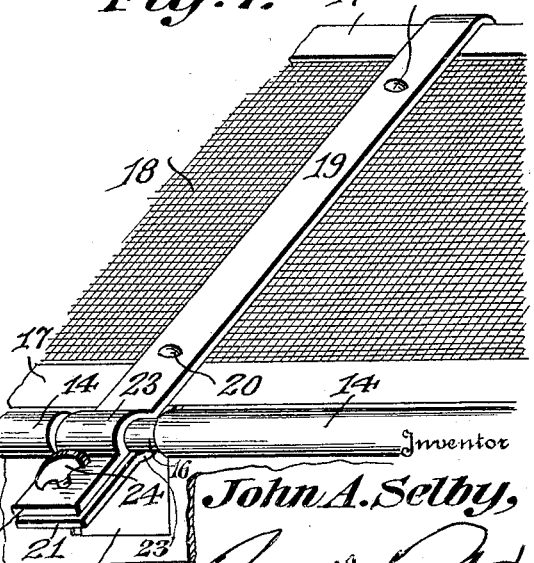

Patented Sept. 13, 1932

1,877,065

UNITED STATES PATENT OFFICE

JOHN A. SELBY, OF PROVIDENCE, RHODE ISLAND

AUTOMOBILE WINDSHIELD SCREEN

Application filed December 14, 1931. Serial No. 581,002.

The invention relates to an adjustable screen and more especially to an automobile windshield screen.

The primary object of the invention is the provision of a screen of this character, wherein the screen proper is mounted within the windshield opening in the body of an automobile so that such screen can be readily and easily adjusted upon the opening of the windshield for ventilating purposes to eliminate the ingress of flies, bugs or other insects, bees or the like to the interior of the automobile, thereby protecting the operator or other persons therein from such pests while riding therein.

Another object of the invention is the provision of a screen of this character, wherein the same is mounted in a novel manner so that the same may be readily and easily adjusted with dispatch and can be mounted and demounted at will and in the mounting eliminates any change or alteration in the standard make-up of the automobile body construction.

A further object of the invention is the provision of a screen of this character, wherein the mounting thereof does not in the least interfere with the windshield, either in the opening or closing thereof and will fully protect an operator of the automobile from insects or the like during the travel of the said automobile.

A still further object of the invention is the provision of a screen of this character, which is extremely simple in construction, thoroughly reliable and efficient in its purpose, strong, durable, neat and attractive in appearance, convenient for adjustment, mountable and demountable, and inexpensive to manufacture and install.

With these and other objects in view the invention consists in the features of construction, combination and arrangement of parts as will be hereinafter more fully described in detail, illustrated in the accompanying drawing, which discloses the preferred embodiment of the invention and pointed out in the claim hereunto appended.

In the accompanying drawing:—

Figure 1 is a fragmentary perspective view of an automobile showing the screen constructed in accordance with the invention applied, the windshield being closed.

Figure 2 is a similar view with the windshield open and the screen accordingly adjusted.

Figure 3 is a plan view of the screen proper.

Figure 4 is the lower supporting base for the screen.

Figure 5 is an enlarged perspective view of a portion of the screen and base showing the bracket or hanger for said screen.

Figure 6 is a sectional view on the line 6—6 of Figure 5.

Figure 7 is a view similar to Figure 5 showing the screen in an adjusted position.

Similar reference characters indicate corresponding parts throughout the several views in the drawing.

Referring to the drawing in detail A designates generally a portion of an automobile body which is of standard construction with the front windshield opening 10 normally closed by an outwardly swinging windshield 11, the latter being mounted for swinging movement in any well known manner.

Within the lower portion of the opening 10 is secured the supporting base 12 which is preferably in the form of a solid sheet metal plate having its lower edge conforming to the upwardly arched sill of the windshield opening 10, while the opposite ends of this plate are formed with right-angular ears or flanges 13 through which are passed suitable detachable fasteners (not shown) for securing the base 12 in place and attached to the front columns of the body A.

The upper straight edge of the base 12 is cut and bent to provide a straight tubular pintle sleeve 14 having several cut-away portions 15 therein bridged by a pintle 16 confined within the sleeve 14.

Above the base 12 is the screen proper which comprises the rigid frame 17 carrying the wire-mesh panel 18 which is held taut therein and secured in any suitable manner. Straddling the frame 17 are spaced brackets or hangers each including an inverted substantially U-shaped clamp 19, its limbs being made fast by rivets or other fasteners 20 to the screen proper, while the lower ends are extended beyond the lower edge of the frame 17 and constitute clamping jaws 21, and 22 respectively. The jaws 21 and 22 each has formed therein a seat 23 for the pintle 16 at the cut-away portion 15 which provides a clearance for both jaws 21 and 22 on the adjustment of the screen. The jaws 21 and 22 are fitted with a tightening screw or binding element 24, so that the clamps 19 can be held tight upon the pintle 16 or such clamps may be detached therefrom by removal of the screws or elements 24 from the jaws of such clamps.

The screen proper is swung outward from normal perpendicular position within the opening 10 when the windshield has been opened from the position shown in Figure 1 to the position shown in Figure 2 of the drawing, the screen being shown in its outwardly swung position in said Figure 2 and in this manner protection is had from insects or the like entering through the opening 10 into the body A of the automobile.

When the windshield 11 is closed the screen proper is disposed perpendicular in the opening 10 rearwardly of said windshield as is shown in Figure 1 of the drawing.

What is claimed is:

A screen of the class described, comprising a base adapted to fit within the lower portion of the windshield opening of an automobile body, a pintle sleeve at the upper edge of the base and having cut-away portions, a pintle in said sleeve and bridging the cut-away portions, a screen section, and inverted substantially U-shaped clamping brackets embracing the screen section and having jaw terminals adjustably and detachably engaging the pintle at the cut-away portions.

In testimony whereof, I affix my signature.

JOHN A. SELBY.